D. DAVIS.
POST HOLE DIGGER.
APPLICATION FILED JUNE 2, 1917.

1,241,931. Patented Oct. 2, 1917.

WITNESSES

INVENTOR
Dewitt Davis
BY Victor J. Evans
ATTORNEY

UNITED STATES PATENT OFFICE.

DEWITT DAVIS, OF JEFFERSON CITY, MISSOURI.

POST-HOLE DIGGER.

1,241,931.  Specification of Letters Patent.  Patented Oct. 2, 1917.

Application filed June 2, 1917. Serial No. 172,461.

*To all whom it may concern:*

Be it known that I, DEWITT DAVIS, a citizen of the United States, residing at Jefferson City, in the county of Jefferson and State of Missouri, have invented new and useful Improvements in Post-Hole Diggers, of which the following is a specification.

This invention relates to post hole diggers and it consists in the novel features hereinafter described and claimed.

An object of the invention is to provide a power operated post hole digger which is mounted upon a carriage whereby it may be easily transported from point to point.

A further object of the invention is to provide a digging element of special design and arrangement and simple and durable means for operating the same from the source of power.

In the accompanying drawing,—

Figure 1:
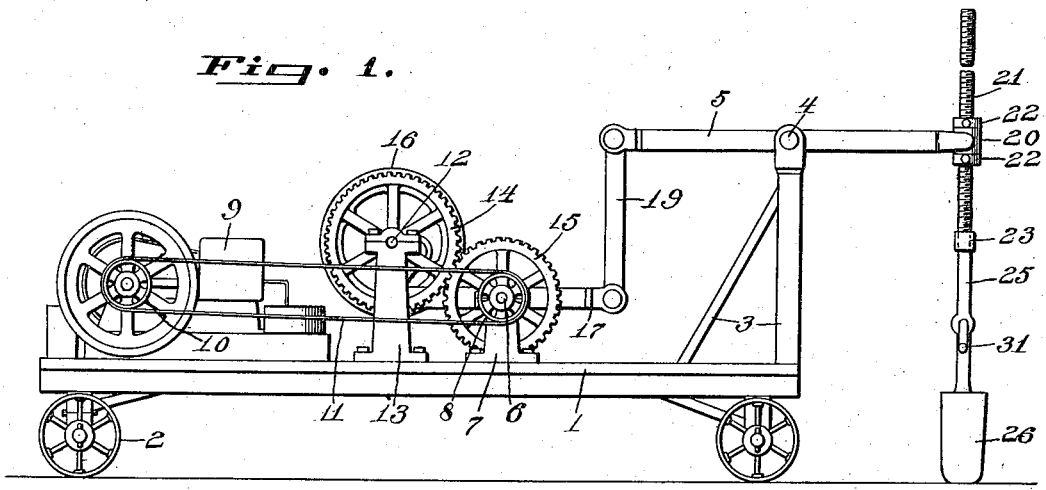
Figure 1 is a side elevation of the post hole digger.
Figure 2:
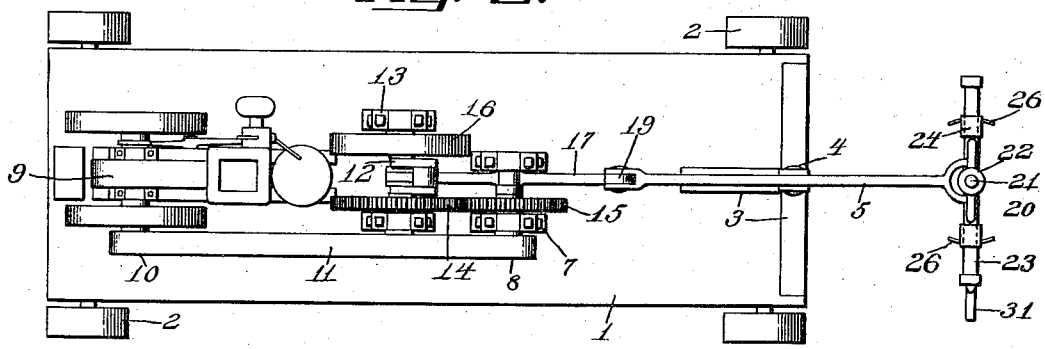
Fig. 2 is a top plan view of the same.
Figures 3, 4:
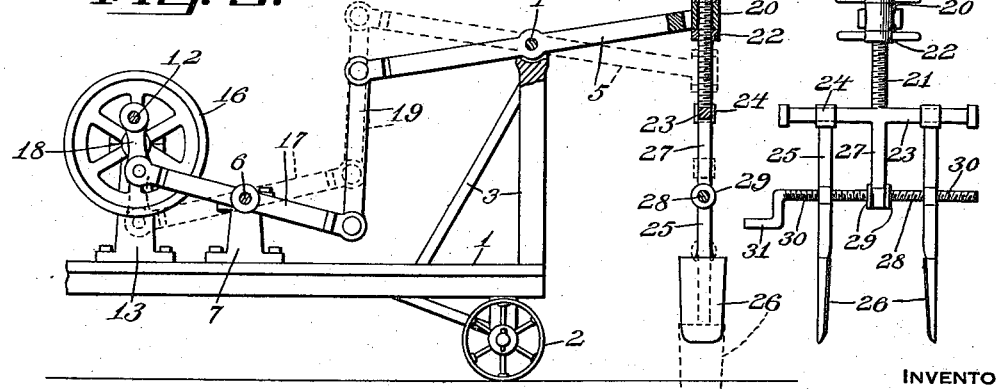
Fig. 3 is a fragmentary vertical sectional view of the same.
Fig. 4 is a side elevation of the digging elements of the machine.

The carriage of the post hole digger comprises a platform 1 which is mounted upon suitable supporting wheels 2. Uprights 3 are mounted at one end of the platform 2 and carry at their upper ends a shaft 4 upon which is pivoted a beam 5. A shaft 6 journaled at the upper ends of uprights 7 which are mounted upon the platform 1 and a pulley 8 is mounted at one end of the said shaft 6. An engine 9 is mounted upon the platform 1 and a pulley 10 is mounted upon the shaft of the said engine. A belt 11 is trained around the pulleys 10 and 8 and adapted to transmit rotary movement from the shaft of the engine 9 to the shaft 6. A crank shaft 12 is journaled at the upper end of the uprights 13 which are mounted upon the platform 1. A gear wheel 14 is fixed to the shaft 12 and meshes with a gear wheel 15 which is fixed to the shaft 6. The shaft 12 is provided with a fly wheel 16. Hence it will be seen that means are provided for transmitting rotary movement from the shaft 6 to the shaft 12.

A lever 17 is fulcrumed upon the shaft 6 and one end of the said lever is operatively connected with the crank of the shaft 12 by means of a link 18. A link 19 operatively connects the other end of the lever 17 with one end of the beam 5. Hence it will be seen that as the crank shaft 12 rotates the link 18 is moved which in turn swings the lever 17 upon the shaft 6 whereby the link 19 is moved longitudinally and the beam 5 is rocked upon the shaft 4.

A block 20 is pivotally mounted at the outer end of the beam 5 and a screw 21 passes loosely through the said block 20. Nuts 22 engage the thread of the screw 21 and lie at the opposite sides of the block 20. The nuts 22 may be provided with suitable handles whereby they may be readily turned without the use of a wrench. The screw 21 carries at its lower end an arm 23 which is preferably square in transverse section. Sleeves 24 are slidably mounted upon the arm 23 and are located one at each side of the screw 21. The openings through the sleeves 24 snugly receive the arm 23 whereby the said sleeves are restrained against turning movement with relation to the said arm. Shafts 25 depend from the sleeves 24 and carry at their lower ends blades 26. The said blades may be of any usual or conventional pattern. A bracket 27 depends from the intermediate portion of the arm 23 and a shaft 28 is journaled in the lower portion of the said bracket. Collars 29 are mounted upon the shaft 28 at the opposite sides of the bracket 27 and hold the said shaft against longitudinal movement through the said bracket. The shaft 28 is provided beyond the outer surfaces of the collars 29 with right and left threads indicated at 30. These threads 30 engage in threaded openings provided at the intermediate portions of the shafts 25 and the said shaft 28 is provided at one end with a crank handle 31.

It is apparent that by rotating the shaft 28 by using the handle 31 the shafts 25 may be brought toward each other or moved away from each other so that the blades 26 may be positioned at a desired distance apart. The blades are spaced from each other for a distance equal to the breadth or width of the post hole which is to be dug. After the blades are positioned at a desired distance from each other the beam 5 is rocked as hereinbefore described and consequently the blades 26 may cut into the ground and loosen the same within the dimensions of the post hole. By turning the nuts 22 the screw 21 and its attachment may be lowered and consequently as the earth is loosened at the upper portion of the post hole the said blade may be lowered and consequently they may cut into the hole at a desired depth. After the soil has been loosened the post hole digger is removed from the vicinity of the hole just dug and by using a shovel or other implement the loosened earth may be removed from the hole.

From the foregoing description taken in conjunction with the accompanying drawing, it will be seen that a post hole digger of simple and durable structure is provided, and that the same may be conveniently used for loosening the earth in a post hole preparatory to the removal of the same and the said post hole digger may be easily and quickly transported from point to point.

Having described the invention what is claimed is:—

1. In a post hole digger a beam mounted for rocking movement, means for rocking the beam, a member carried by the beam and depending therefrom, an arm attached to said member, sleeves slidably mounted upon the arm, shafts carried by the sleeves, means for moving the shafts toward or away from each other, and blades carried by the shafts.

2. In a post hole digger a beam mounted for rocking movement, means for rocking the beam, a member depending from the beam, means for raising and lowering the member with relation to the beam, an arm carried by the member, sleeves slidably mounted upon the arm, shafts depending from the sleeves, means for moving the shafts toward or away from each other and blades carried by the shafts.

In testimony whereof I affix my signature.

DEWITT DAVIS.